（12） United States Patent
Yoo et al.

(10) Patent No.: US 9,806,638 B2
(45) Date of Patent: Oct. 31, 2017

(54) APPARATUS FOR CONTROLLING GRID-CONNECTED INVERTER

(71) Applicant: LSIS CO., LTD., Anyang-si, Gyeonggi-do (KR)

(72) Inventors: An No Yoo, Seoul (KR); Eun Sik Choi, Incheon (KR)

(73) Assignee: LSIS CO., LTD., Anyang-si (KR)

( * ) Notice: Subject to any disclaimer, the term of this patent is extended or adjusted under 35 U.S.C. 154(b) by 0 days.

(21) Appl. No.: 15/090,303

(22) Filed: Apr. 4, 2016

(65) Prior Publication Data

US 2016/0308465 A1     Oct. 20, 2016

(30) Foreign Application Priority Data

Apr. 14, 2015    (KR) ........................ 10-2015-0052138

(51) Int. Cl.
*H02M 7/5395*     (2006.01)
*H02M 1/12*     (2006.01)
*H02M 7/5387*     (2007.01)
*H02J 3/38*     (2006.01)
*H02M 1/00*     (2006.01)

(52) U.S. Cl.
CPC .............. *H02M 7/5395* (2013.01); *H02J 3/38* (2013.01); *H02M 1/12* (2013.01); *H02M 7/53875* (2013.01); *H02M 2001/0025* (2013.01)

(58) Field of Classification Search
CPC .......... H02M 7/127; H02M 7/48; H02M 7/51; H02M 7/5395; H02M 7/62; H02M 3/335; H02M 3/33507; H02M 3/33523; H02M 1/22; H02M 1/26; H02M 1/30; H02M 1/62; H02M 2001/0032; H02J 3/06
USPC ........................................................ 363/95–98
See application file for complete search history.

(56) References Cited

U.S. PATENT DOCUMENTS

| 8,068,352 B2 * | 11/2011 | Yu .............................. H02J 3/38 307/16 |
| 8,575,780 B2 * | 11/2013 | Moon ....................... H02J 9/062 307/125 |
| 8,767,421 B2 * | 7/2014 | Chapman ................. H02J 3/383 363/131 |

FOREIGN PATENT DOCUMENTS

JP     2000308264     11/2000

OTHER PUBLICATIONS

Japan Patent Office Application No. 2016-080358, Office Action dated Jun. 6, 2017, 4 pages.

* cited by examiner

*Primary Examiner* — Yemane Mehari
(74) *Attorney, Agent, or Firm* — Lee, Hong, Degerman, Kang & Waimey

(57) ABSTRACT

An apparatus for controlling a grid-connected inverter is disclosed. The apparatus according to an exemplary embodiment of the present disclosure is configured to promote an increase in efficiency of grid-connected inverter system and to improve a current THD by generating a voltage command by changing an offset voltage in response to size of DC-link power voltage and size of apparent power.

9 Claims, 4 Drawing Sheets

APPARATUS FOR CONTROLLING GRID-CONNECTED INVERTER

CROSS-REFERENCE TO RELATED APPLICATIONS

Pursuant to 35 U.S.C. §119(a), this application claims the benefit of earlier filing date and right of priority to Korean Patent Application Number 10-2015-0052138 filed on Apr. 14, 2015, the contents of which are all hereby incorporated by reference herein in its entirety.

TECHNICAL FIELD

The teachings in accordance with the exemplary embodiments of this present disclosure generally relate to an apparatus for controlling a grid-connected inverter.

BACKGROUND

A grid-connected inverter is a power conversion device widely used in such fields as wind power, solar power and energy storage apparatus, and the trend is that its use is gradually on the increase. Particularly, a medium or large capacity power conversion apparatus of more than several kW is gradually expanded in its area of use for grid stability in response to increase in use of new renewable energy. A conventional grid-connected inverter is controlled by a spatial vector PWM (Pulse Width Modulation) method using an offset voltage, and this method is advantages of improving THD (Total Harmonic Distortion) of output current.

However, the spatial vector PWM (Pulse Width Modulation) method suffers from disadvantages of degraded system efficiency due to increased switching loss, because all switches of power semiconductors are switched while constantly maintaining an offset voltage.

SUMMARY

The technical subject to be solved by the present disclosure is to provide an apparatus for controlling a grid-connected inverter configured to promote a system efficiency increase by changing an offset voltage in response to size of an output voltage.

In one general aspect of the present disclosure, there is provided an apparatus for controlling a grid-connected inverter including a DC link capacitor receiving a voltage inputted from a DC power source, and a switching unit comprised of a plurality of power semiconductors, the apparatus comprising:

a first determinator determining an active power and inactive power from an output voltage and an output current from the inverter;

a power controller generating a current command using an active power command and an inactive power command, and the active power and the inactive power determined by the first determinator;

a current controller generating a voltage to be synthesized by the inverter from the current command;

a voltage generating unit generating a voltage command to be applied to the inverter from a voltage received from the current controller; and a controller generating a PWM (Pulse Width Modulation) signal to control the switching unit of the inverter using the voltage command.

Preferably, but not necessarily, the voltage generating unit may include a second determinator determining a size of an output voltage of the current controller, a third determinator determining an apparent power using the active power and the inactive power determined by the first determinator, and an applying unit outputting a voltage command by applying an offset voltage to an output voltage of the current controller, using the size of the output voltage determined by the second determinator, a voltage at the DC link capacitor and the apparent power.

Preferably, but not necessarily, the voltage generating unit may further include an over-modulation unit limiting a voltage command, which is an output of the applying unit, to a predetermined size.

Preferably, but not necessarily, the predetermined size limited by the over-modulation may be ½ the voltage of the DC link capacitor.

Preferably, but not necessarily, the second determinator may determine the size of the output voltage of the current controller by converting a 3-phase output voltage of the current controller to d axis and q axis voltages on a synchronous coordinate frame.

Preferably, but not necessarily, the applying unit may include a fourth determinator determining a first offset voltage using a maximum value and a minimum value of the output current of the 3-phase current controller, a fifth determinator determining a second offset voltage using the voltage of DC-link capacitor, a selector selecting one of the first and second offset voltages using the apparent power and the voltage modulation index, and a sixth determinator determining a voltage command by applying an offset voltage selected by selection of the selector to a size of the output voltage of the current controller.

Preferably, but not necessarily, the selector may select the second offset voltage when the voltage modulation index is greater than a pre-selected variable and the apparent power is greater than a pre-selected standard, and at this time, the controller may perform a discontinuous PWM control.

Preferably, but not necessarily, the selector may select the first offset voltage when the voltage modulation index is smaller than a pre-selected variable and the apparent power is smaller than a pre-selected standard, and at this time, the controller may perform a spatial vector PWM control.

ADVANTAGEOUS EFFECTS

The present disclosure has an advantageous effect in that efficiency of grid-connected inverter system can be increased by generating a voltage command by changing an offset voltage in response to size of DC-link power voltage and size of apparent power.

DETAILED DESCRIPTION

Various exemplary embodiments will be described more fully hereinafter with reference to the accompanying drawings, in which some exemplary embodiments are shown. The present inventive concept may, however, be embodied in many different forms and should not be construed as limited to the example embodiments set forth herein. Rather, the described aspect is intended to embrace all such alterations, modifications, and variations that fall within the scope and novel idea of the present disclosure.

Hereinafter, exemplary embodiments of the present disclosure will be described in detail with reference to the accompanying drawings.

Figure 1:
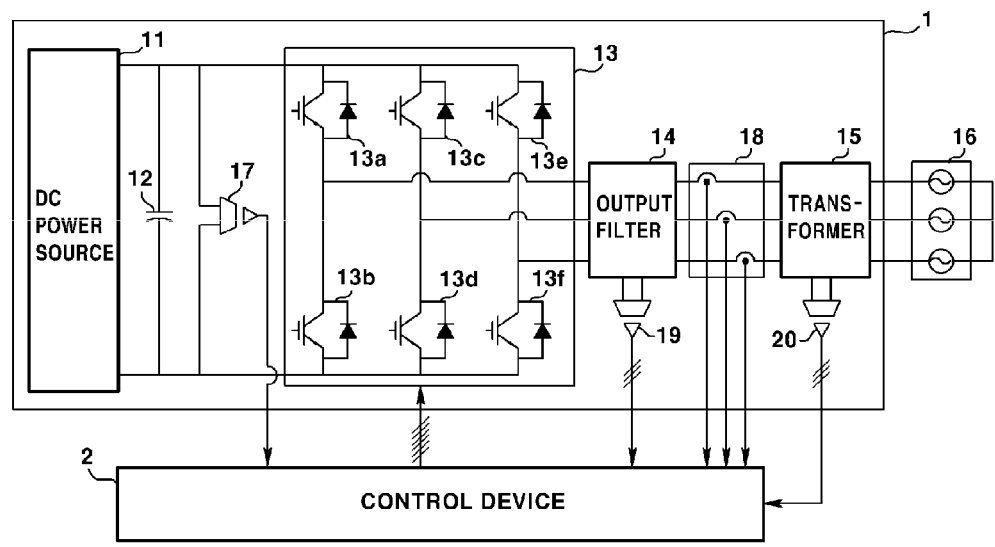
FIG. 1 is a schematic block diagram illustrating a grid-connected inverter system according to the present disclosure.

FIG. 1 is a schematic block diagram illustrating a grid-connected inverter system according to the present disclosure.

Referring to FIG. 1, the grid-connected inverter system according to the present disclosure may be comprised of a grid-connected inverter (1) and a control device (2), where the grid-connected inverter (1) may include a DC (Direct Current) power source (11), a DC-link capacitor (12), a switching unit (13), an output filter (14), a transformer (15), first to third voltage detectors (17, 19, 20) and a current detector (18), and the control device (2) may include can control the inverter (1) by receiving signals from the first to third voltage detectors (17, 19, 20) and the current detector (18). However, although the control device (2) is illustrated and explained to be arranged outside of the inverter (1) according to an exemplary embodiment of the present disclosure for convenience sake, the present disclosure is not limited thereto, and the control device (2) may be arranged inside of the inverter (1).

The DC power source (11) may be a power source such as a battery or photovoltaic array. The DC power source (11) according to an exemplary embodiment of the present disclosure may include a DC boost converter. The DC-link capacitor (12) may reduce pulsation of DC voltage applied from the DC power source (11) and may supply an electric power during instantaneous power failure by accumulating voltages. The switching unit (13) is a device configured to convert the supplied DC voltage to AC voltage, and may include a plurality of power semiconductors (13a to 13f). The plurality of power semiconductors (13a to 13f) may be an IGBT (Insulated Gate Bipolar Mode Transistor), an MOSFET (Metal Oxide Silicon Field-Effect Transistor) and the like. However, the present disclosure is not limited thereto, and various power semiconductors may be used.

The output filter (14) may reduce the THD (Total hamonic distortion) of a current outputted from the switching unit (13), and may be an LC (Inductor-Capacitor) filter, or an LCL (Inductor-Capacitor-Inductor) filter, for example.

The transformer (15) may provide insulation between a grid and the inverter system of the present disclosure, and may provide a 3-phase power (16) to the grid. Furthermore, the transformer (15) may perform the conversion in order to convert the power of the grid to an input power of the switching unit (13). However, the arrangement of transformer (15) may be selective. The first to third voltage detectors (17, 19, 20) may measure a voltage across the DC-link capacitor (12). Although the first voltage detector (17) is arranged to measure a voltage of the DC-link capacitor (12), the first voltage detector (17) is arranged to measure a voltage across the DC power source (11), and may be arranged to measure the voltage of the DC-link capacitor (12) and to measure the voltage across the DC power source (11).

The current detector (18) is to measure a phase current which is an output of the switching unit (13), and may be arranged between the output filter (14) and the transformer (15). But the current detector (18) may be arranged between the switching unit (13) and the output filter (14), and may be also arranged between the output filter (14) and the transformer (15) and between the switching unit (13) and the output filter (14).

The second and third voltage measuring units (19, 20) are to measure an output voltage, and may measure all 3-phase voltages of the switching unit (13) and may also measure a 2-phase voltage. At this time, although the second and third voltage measuring units (19, 20) are illustrated to measure all the output voltages of the output filter (14) and the transformer (15), the present disclosure is not limited thereto, and the second and third voltage measuring units (19, 20) may be selectively arranged on any one of the output filter (14) and the transformer (15), and measure an output voltage of the output filter (14) or an output voltage of the transformer (15).

The control device (2) according to the present disclosure is to control the grid-connected inverter system thus configured, and may receive a current state of the inverter system from the first voltage detector (17), the current detector (18), and the second and third voltage measuring units (19, 20), and may output a signal for controlling the switching unit (13).

Figure 2:
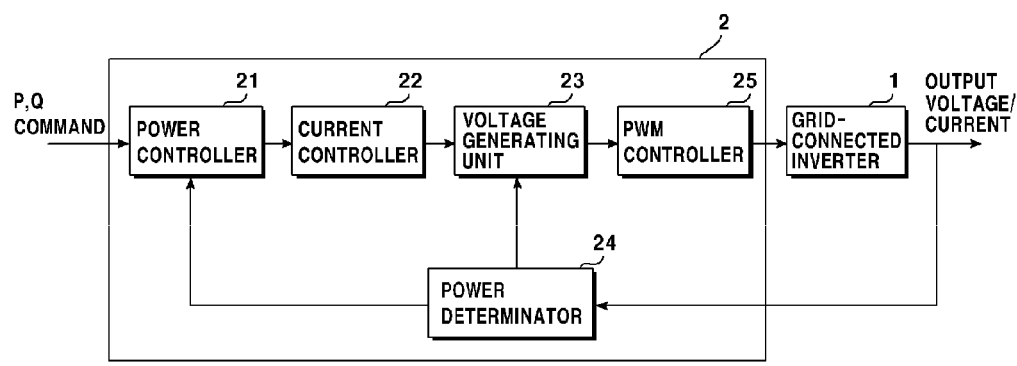
FIG. 2 is a detailed block diagram illustrating a control device according to an exemplary embodiment of the present disclosure.

FIG. 2 is a detailed block diagram illustrating a control device (2) according to an exemplary embodiment of the present disclosure.

Referring to FIG. 2, the control device (2) according to the present disclosure may include a power controller (21), a current controller (22), a voltage generating unit (23), a power determinator (24) and a PWM controller (25). The power controller (21) may receive an active power (P) command and an inactive power (Q) command and generate a current command of the current controller (22) by receiving an active power and an inactive power determined by the power determinator (24). The current controller (22) may generate a 3-phase voltage to be synthesized by the grid-connected inverter (1) from the current command generated by the power controller (21) and the measured actual current. The voltage generating unit may generate a synthesizable voltage by receiving a voltage, which is an output of the current controller (22), and may generate a voltage command to be actually applied to the grid-connected inverter (1). The PWM controller (25) may provide a PWM signal to the switching unit (13) of the inverter (1) by receiving a voltage command from the voltage generating unit (23), whereby the power semiconductor of the switching unit (13) may be switched by a relevant PWM signal. The power determinator (24) may determine the currently outputted active power and the inactive power from the output voltage and the output current of the grid-connected inverter (1).

Hereinafter, configuration of voltage generating unit according to prior art in the control device (2) thus described, and operation of the voltage generating unit (23) according to the present disclosure will be described in detail in comparison therewith.

Figure 3:
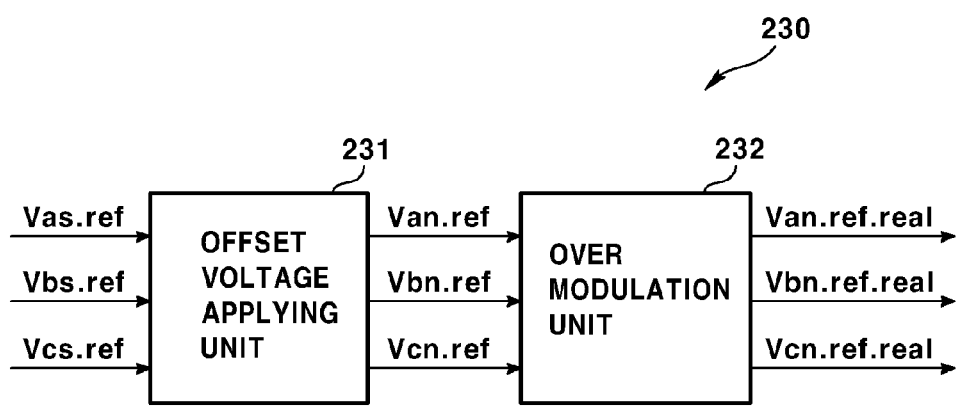
FIG. 3 is a detailed block diagram illustrating a voltage generating unit according to prior art.

FIG. 3 is a detailed block diagram illustrating a voltage generating unit according to prior art.

Referring to FIG. 3, the voltage generating unit (230) according to prior art. May include an offset voltage applying unit (231) and a over-modulation unit (232). The offset voltage applying unit (231) may determine an offset voltage of 3-phase command voltages (Vas.ref, Vbs.ref, Vcs.ref) from the current controller (22), and may output the corrected command voltages (Van.ref, Vbn.ref,Vcn.ref) by adding the offset voltage to the 3-phase command voltage.

The offset voltage may be determined by the following Equation 1, when using a spatial vector PWM using an offset voltage.

$$V_{SN} = -\frac{V_{max} + V_{min}}{2} \quad \text{[Equation 1]}$$

where, Vmax is a maximum value of the 3-phase command voltages (Vas.ref, Vbs.ref, Vcs.ref), and Vmin is a minimum value of the 3-phase command voltages (Vas.ref, Vbs.ref, Vcs.ref). An output of the offset voltage applying unit (231) may be determined by the following Equations 2-4 from the offset voltages thus determined.

$$V_{an.ref} = V_{as.ref} + V_{sn} \quad \text{[Equation 2]}$$

$$V_{bn.ref} = V_{bs.ref} + V_{sn} \quad \text{[Equation 3]}$$

$$V_{cn.ref} = V_{cs.ref} + V_{sn} \quad \text{[Equation 4]}$$

Even if an offset voltage is applied to a phase voltage, a finally outputted line voltage remains unchanged. Therefore, there is an advantage of improving the THD of an output current applied to the inverter (1) by the application of offset voltage thus discussed.

The over modulation unit (232) may output 0.5×Vdc instead of Van.ref when the Van.ref is greater than 0.5×Vdc, and output −0.5×Vdc when the Van.ref is smaller than −0.5×Vdc, and when the Van.ref is between 0.5×Vdc and −0.5×Vdc, the over modulation unit (232) may output Van.ref as is. This may be applied in the same manner as in Vbn.ref and Vcn.ref. At this time, Vdc is a voltage at the DC-link capacitor (12).

Although the voltage generating unit (230) according to prior art may improve the THD by generating a voltage command by constantly applying an offset voltage while adopting a spatial vector PWM method using the offset voltage, there was still a disadvantage of the system efficiency being decreased due to increased switching loss, because all switches of the switching unit (13) must be switched at all times.

The present disclosure is provided to solve the aforementioned problems and the present disclosure can improve the switching loss by changing the offset voltage in response to the size of the output voltage.

Figure 4:
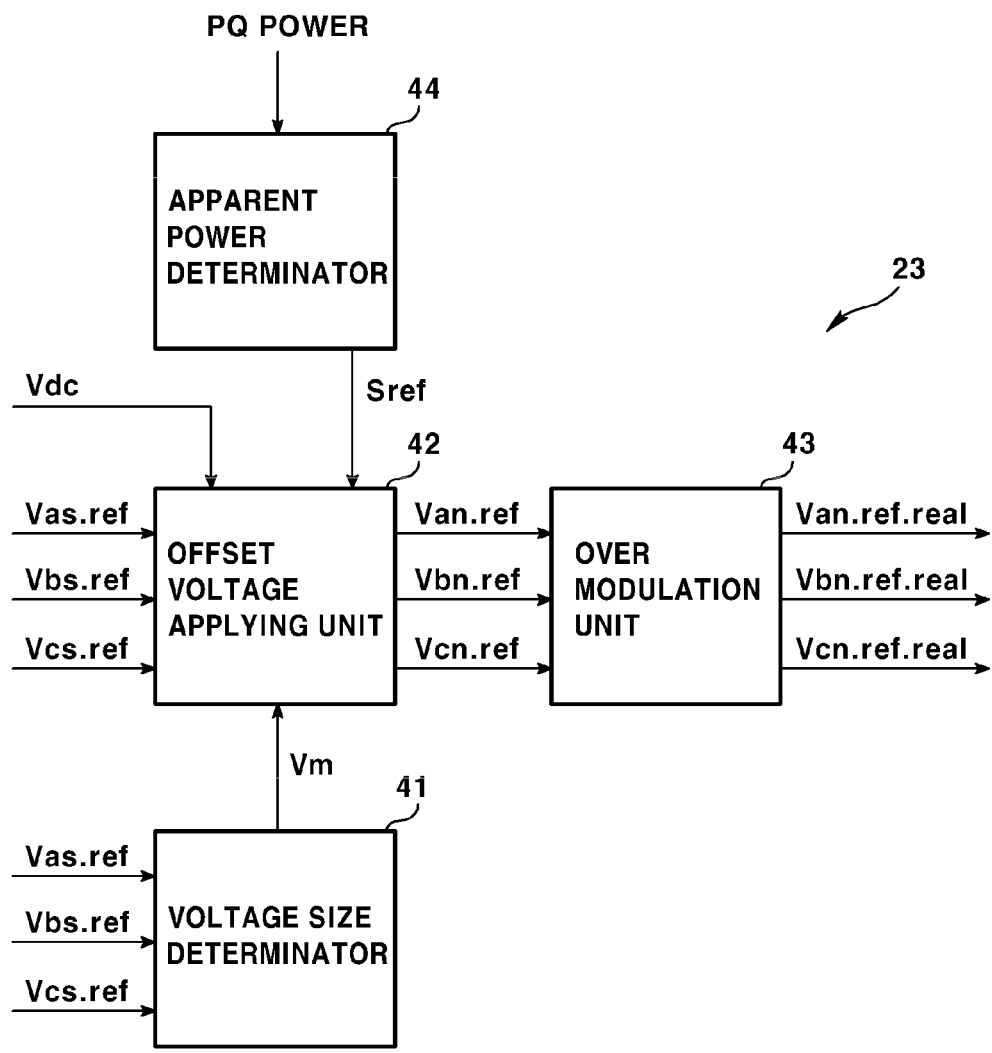
FIG. 4 is a detailed block diagram illustrating a voltage generating unit of a control device according to an exemplary embodiment of the present disclosure.

FIG. 4 is a detailed block diagram illustrating a voltage generating unit (23) of a control device according to an exemplary embodiment of the present disclosure.

Referring to FIG. 4, the voltage generating unit (23) of a control device according to an exemplary embodiment of the present disclosure may include a voltage size determinator (41), an offset voltage applying unit (42), and over modulation unit (43) and an apparent power determinator (44).

The voltage size determinator (41) may determine the size of the output voltage of the current controller (22). The over modulation unit (43) may limit the output of the offset voltage applying unit (42) to a size corresponding to half the size of the voltage of the DC-link capacitor (12), and operation thereof is same as that of the over modulation unit (232) of FIG. 3.

That is, the over modulation unit (43) may output 0.5× Vdc instead of the output of the offset voltage applying unit (42) when the output of the offset voltage applying unit is greater than 0.5×Vdc, and output −0.5×Vdc when the output of the offset voltage applying unit (42) is smaller than −0.5×Vdc, and when the output of the offset voltage applying unit (42) is between 0.5×Vdc and −0.5×Vdc, the over modulation unit (43) may output the output of the offset voltage applying unit (42) as is. At this time, Vdc is a voltage at the DC-link capacitor (12).

The offset voltage applying unit (42) may receive the size of the output voltage of the current controller (22) received from the voltage size determinator (41), the voltage (Vdc) of the DC-link capacitor (12), an apparent power (Sref) required by the grid-connected inverter (1) and the 3-phase output voltage to determine the offset voltage anew, and apply same to the 3-phase output voltage of the current controller (22). Furthermore, the apparent power determinator (44) may determine an apparent power from the active power and the inactive power received from the power determinator (24).

Hereinafter, configuration of the voltage generating unit (23) according to the present disclosure will be described in detail with reference to FIGS. 2 and 4.

The 3-phase output voltage of the current controller (22) may be defined by the following Equations 5 to 7.

$$V_{as\cdot ref} = V_m \sin(\omega t) \quad \text{[Equation 5]}$$

$$V_{bs\cdot ref} = V_m \sin\left(\omega t - \frac{2}{3}\pi\right) \quad \text{[Equation 6]}$$

$$V_{cs\cdot ref} = V_m \sin\left(\omega t + \frac{2}{3}\pi\right) \quad \text{[Equation 7]}$$

At this time, ω is a grid frequency, and the voltage size determinator 41) is to obtain Vm, which is a size of sine wave of Equations 5-7.

The voltage size determinator (41) may convert the 3-phase output voltage to d axis and q axis voltages on a stationary reference frame according to the following Equations.

$$V_{ds}^s = \frac{2V_{as\cdot ref} - V_{bs\cdot ref} - V_{cs\cdot ref}}{3} \quad \text{[Equation 8]}$$

$$V_{qs}^s = \frac{V_{bs\cdot ref} - V_{cs\cdot ref}}{\sqrt{3}} \quad \text{[Equation 9]}$$

Furthermore, the voltage size determinator (41) may convert the voltages on the stationary reference frame of Equations 8 and 9 to d axis and q axis voltages on a synchronous reference frame. The thus converted d axis and q axis voltages on the stationary reference frame are DC where 3-phase AC components are expressed as being mutually orthogonal, such that there is an advantage of simplified system interpretation.

$$V_{ds}^e = V_{ds}^s \cos\theta + V_{qs}^s \sin\theta \quad \text{[Equation 10]}$$

$$V_{qs}^e = -V_{ds}^s \sin\theta + V_{qs}^s \cos\theta \quad \text{[Equation 11]}$$

wherefrom the size of voltages may be obtained from the following Equation 12.

$$V_m = \sqrt{V_{ds}^{e2} + V_{qs}^{e2}} \quad \text{[Equation 12]}$$

Meantime, the active power and the inactive power determined by the power determinator of FIG. 2 may be as from the following Equations 13 and 14.

$$P = 1.5(V_{ds}^e i_{ds}^e + V_{qs}^e i_{qs}^e) \quad \text{[Equation 13]}$$

$$Q = 1.5(V_{qs}^e i_{ds}^e - V_{ds}^e i_{qs}^e)) \quad \text{[Equation 14]}$$

The apparent power of the apparent power determinator (44) of the above Equations 13 and 14 may be determined by the following Equation 15.

$$S=\sqrt{P^2+Q^2} \quad \text{[Equation 15]}$$

Figure 5:
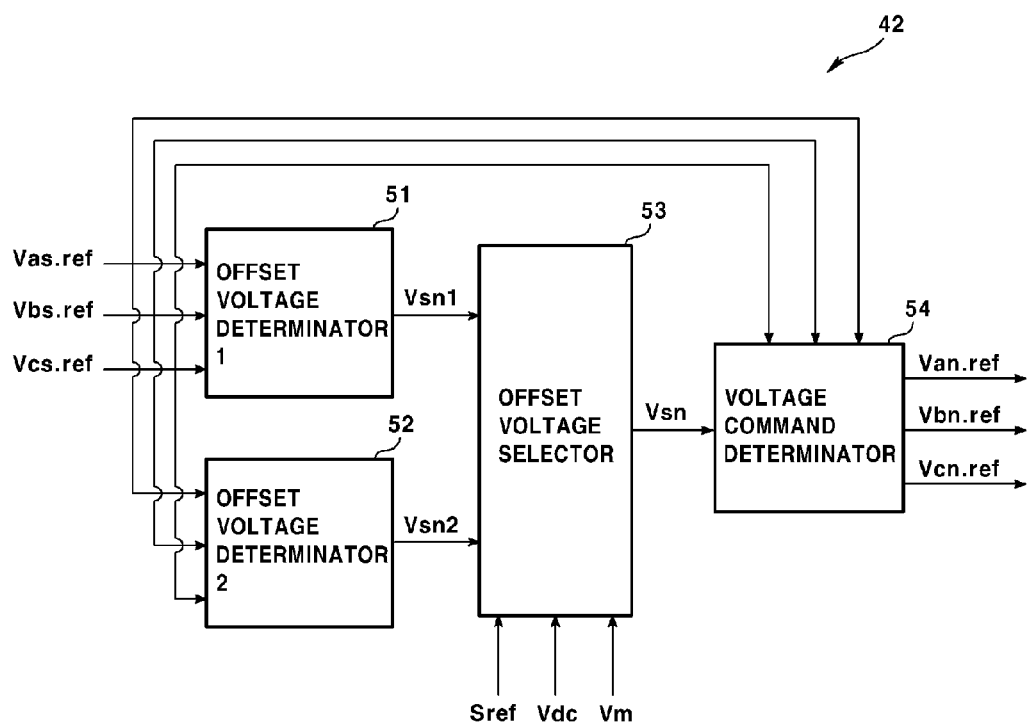
FIG. 5 is a detailed block diagram illustrating an offset voltage applying unit of FIG. 4.

FIG. 5 is a detailed block diagram illustrating an offset voltage applying unit (42) of FIG. 4.

Referring to FIG. 5, the offset voltage applying unit (42) may include first and second offset voltage determinators (51, 52), an offset voltage selector (53) and a voltage command determinator (54).

A final voltage command is outputted by selecting, by the offset voltage selector (53), the offset voltages respectively obtained by the first and second offset voltage determinators (51, 52), and by applying the selected offset to the voltage applied from the current controller (22).

Hereinafter, an offset voltage determined by the first offset voltage determinator (51) is defined as 'first offset voltage', and an offset voltage determined by the second offset voltage determinator (52) is defined as 'second offset voltage'.

The first offset voltage determinator (51) may determine the first offset voltage according to the following Equation 16.

$$V_{sn1} = -\frac{V_{max}+V_{min}}{2} \quad \text{[Equation 16]}$$

At this time, Vmax is a maximum value of Vas.ref, Vbs.ref, Vcs.ref, and Vmin is a minimum value of Vas.ref, Vbs.ref, Vcs.ref. Furthermore, the second offset voltage determinator (52) may determine the second offset voltage according to the following Equation 17.

$$V_{sn2}=-(V_{as.ref}-V_{as.real}+V_{bs.ref}-V_{bs.real}+V_{cs.ref}-V_{cs.real}) \quad \text{[Equation 17]}$$

where, Vas.real, Vbs.real, Vcs.real are defined by the following Equations 18 to 20.

$$V_{as\cdot real} = \text{bound}\left(\left(-k_2\frac{V_{dc}}{2},-\frac{V_{dc}}{2}\right),\left(k_2\frac{V_{dc}}{2},\frac{V_{dc}}{2}\right),V_{as\cdot ref}\right) \quad \text{[Equation 18]}$$

$$V_{bs\cdot real} = \text{bound}\left(\left(-k_2\frac{V_{dc}}{2},-\frac{V_{dc}}{2}\right),\left(k_2\frac{V_{dc}}{2},\frac{V_{dc}}{2}\right),V_{bs\cdot ref}\right) \quad \text{[Equation 19]}$$

$$V_{cs\cdot real} = \text{bound}\left(\left(-k_2\frac{V_{dc}}{2},-\frac{V_{dc}}{2}\right),\left(k_2\frac{V_{dc}}{2},\frac{V_{dc}}{2}\right),V_{cs\cdot ref}\right) \quad \text{[Equation 20]}$$

At this time, a bound function is defined by the following Equation.

$$\text{bound}((a,b),(c,d),x) = \begin{cases} b, & x<a \\ d, & x>c \\ x, & a \leq x \leq c \end{cases} \quad \text{[Equation 21]}$$

Furthermore, k2 of the Equations 18 to 20 is a value set by a user, and may have a scope of the following Equation 22.

$$\begin{cases} \frac{\sqrt{3}}{2}D\frac{k_2}{MI}D1 \\ 0 D k_2 D 1 \end{cases} \quad \text{[Equation 22]}$$

MI in the above Equation is an MI (Modulation Index), and may be defined by the following Equation 23.

$$MI = \frac{2V_m}{V_{dc}} \quad \text{[Equation 23]}$$

The offset voltage selector (53) is to select one of the first and second offset voltages, and may select one of the first and second offset voltages in response to voltage modulation index and apparent power.

That is, the offset voltage selector (53) may select the second offset voltage of Equation 17, when a voltage modulation index is greater than k1 which is a variable selected by a user, and an apparent power is greater than a pre-selected Smin, and may select the first offset voltage in other cases (i.e., when a voltage modulation index is smaller than k1, or when an apparent power is smaller than a pre-selected Smin), which may be defined by the following Equation 24.

$$V_{sn} = \begin{cases} V_{sn2} & \text{if}(MI \geq k_1) \text{ and } (S_{ref} \geq S_{min}) \\ V_{sn1} & \text{otherwise} \end{cases} \quad \text{[Equation 24]}$$

Thus, a voltage command outputted by the voltage command determinator (54) may be determined by the following Equations 25-27.

$$V_{an.ref}=V_{as.ref}+V_{sn} \quad \text{[Equation 25]}$$

$$V_{bn.ref}=V_{bs.ref}+V_{sn} \quad \text{[Equation 26]}$$

$$V_{cn.ref}=V_{cs.ref}+V_{sn} \quad \text{[Equation 27]}$$

The PWM controller (25) may generate a PWM signal using the voltage command thus determined.

In an exemplary embodiment of the present disclosure, when the voltage modulation index is smaller than k1, or when the required apparent power is small, voltages are synthesized using an offset voltage using the conventionally used maximum value and minimum value as in Equation 16, and when the required apparent power is greater than a predetermined value, the offset voltage may be changed as in Equation 17 to be converted to a DPWM (Discontinuous PWM).

At this time, k2 satisfying the Equation 22 determines the DPWM value, such that it is noted to nearing to 60 degree DPWM, as k2 grows smaller.

The spatial vector PW control using the conventional offset voltage reduces the THD of an output current in the grid-connected inverter, but suffers from disadvantages of reducing system efficiency due to increased switching loss at the switching unit of the inverter.

When performing the DPWM using the offset voltage of Equation 17, there is an advantage of increased entire system efficiency due to decreased switching loss because of DPWM characteristics, but a problem arises of an increased THD of output current.

Thus, the PWM controller (25) proposed by the present disclosure is such that, in consideration of the THD being relatively improved when the required apparent power grows larger, and an absolute value of loss being increased when the apparent power grows larger, some of switches in the power semiconductor in the switching unit (13) perform the no-switching DPWM control for a predetermined section using the proposed offset voltage when the apparent power is great, and the spatial vector PWM control is performed using the conventional offset voltage in order to prevent distortions by THD when the required apparent power is small.

The spatial vector PWM and DPWM control methods in the PWM controller (25) are well known to the skilled in the art, and therefore, detailed descriptive explanation will be omitted herein as these are not closely related to the present disclosure.

Furthermore, although the size of output voltage remains unchanged under a condition where a grid voltage is constantly maintained in the grid-connected inverter (1), the voltage modulation index (MI) may be changed because the voltage of DC-link capacitor (12) connected to the DC power source like a battery or a solar module changes.

The control device according to the present disclosure is provide in consideration of this point, such that, when the voltage modulation index (MI) is small, the voltage at the DC-link capacitor (12) is relatively high, and a current is susceptible to harmonic component. Therefore, when the voltage modulation index (MI) is small, the spatial vector PWM control is performed using the conventional offset voltage with a good THD index, and when the voltage modulation index (MI) is high, a DPWM control is performed using a new offset voltage to realize the improvement in the aspect of efficiency.

Although the present disclosure has been described and explained according to exemplary embodiments, the present disclosure is not limited to a particular exemplary embodiment but many alternatives, modifications, and variations will be apparent to those skilled in the art within the metes and bounds of the claims. Therefore, it should be understood that the above-described embodiments are not limited by any of the details of the foregoing description, unless otherwise specified, but rather should be construed broadly within the scope as defined in the appended claims.

The invention claimed is:

1. An apparatus for controlling a grid-connected inverter, the inverter including a DC link capacitor receiving a voltage from a DC power source, the apparatus comprising:
   a first determinator configured to determine active power and reactive power based on an output voltage and current of the inverter;
   a power controller configured to use an active power command, a reactive power command and the determined active power and reactive power to generate a current command;
   a current controller configured to generate a voltage based on the current command, the generated voltage synthesized by the inverter;
   a voltage generating unit configured to generate a voltage command based on the generated voltage, the generated voltage command applied to the inverter; and
   a controller configured to use the generated voltage command to generate a PWM (Pulse Width Modulation) signal to control a switching unit of the inverter,
   wherein the voltage generating unit includes a second determinator, a third determinator and an applying unit,
   wherein the second determinator is configured to determine a size of the generated voltage,
   wherein the third determinator is configured to use the determined active power and reactive power to determine apparent power, and
   wherein the applying unit is configured to generate the voltage command by applying an offset voltage to the generated voltage and using the determined size of the generated voltage, a voltage at the DC link capacitor and the determined apparent power.

2. The apparatus of claim 1, wherein the voltage generating unit further includes an over-modulation unit configured to limit the generated voltage command to a predetermined size.

3. The apparatus of claim 2, wherein the predetermined size is ½ the voltage at the DC link capacitor.

4. The apparatus of claim 1, wherein the second determinator is further configured to determine the size of the generated voltage by converting a 3-phase output voltage to d-axis and q-axis voltages on a synchronous coordinate frame.

5. The apparatus of claim 1, wherein the applying unit includes:
   a fourth determinator configured to determine a first offset voltage using a maximum value and a minimum value of an output current of the current controller;
   a fifth determinator configured to determine a second offset voltage using the voltage at the DC-link capacitor;
   a selector configured to use the determined apparent power and a voltage modulation index to select the determined first offset voltage or determined second offset voltage; and
   a sixth determinator configured to generate the voltage command by applying the selected first offset voltage or second offset voltage to the generated voltage.

6. The apparatus of claim 5, wherein the selector is further configured to select the second offset voltage when the voltage modulation index is greater than a pre-selected variable and the determined apparent power is greater than a pre-selected value.

7. The apparatus of claim 6, wherein the controller is further configured to perform discontinuous PWM control.

8. The apparatus of claim 5, wherein the selector is further configured to select the first offset voltage when the voltage modulation index is smaller than a pre-selected variable and the determined apparent power is smaller than a pre-selected value.

9. The apparatus of claim 8, wherein the controller is further configured to perform spatial vector PWM control.

* * * * *